(No Model.)

P. MURPHY & J. J. LYNETT.
CART SCALE.

No. 249,078. Patented Nov. 1, 1881.

Witnesses:
J. J. Scanlan
Jno. Ledford

Inventors:
Patrick Murphy,
James Joseph Lynett,
Per Atty
R. Arthur Mellons

UNITED STATES PATENT OFFICE.

PATRICK MURPHY AND JAMES J. LYNETT, OF MONTREAL, QUEBEC, CANADA.

CART-SCALE.

SPECIFICATION forming part of Letters Patent No. 249,078, dated November 1, 1881.

Application filed April 21, 1881. (No model.)

*To all whom it may concern:*

Be it known that we, PATRICK MURPHY and JAMES JOSEPH LYNETT, both of the city of Montreal, in the district of Montreal and Province of Quebec, in the Dominion of Canada, have jointly invented a certain new and useful Scale-Cart; and we do hereby declare that the following is a full, clear, and exact description of the same.

Our invention relates to improvements in that class of carts which are generally used for carrying coal and other articles of merchandise which are sold by weight, and has for its object to combine permanently with a vehicle of any usual pattern and adapted for the purpose an apparatus whereby the load may be weighed. In other words, we provide a "scale-cart" which will allow of its contents or load being tested as to weight without in the first place being taken to a public or private scale, and in the second place makes it convenient for the purchaser of the coal, &c., to see for himself that the weight of merchandise ordered is being properly accounted for. We attain this object by attaching to the frame carried upon the axle standards, one on each side of the cart, inside the wheels, and located so as to be in the center of the cart-body. Properly pivoted to boxes sliding up and down in these standards is the beam, which extends around the front of the cart from one standard to the other, being, however, graduated or scaled only on one section—that is to say, on that part of the beam which passes along one side of the cart-body— a sliding weight being provided and also a stirrup located in the front of the cart and equidistant from each standard or point of suspension for extra weights when the load is heavier than is allowed for in graduating the beam. A shaft having its bearings formed in the frame extends across the cart just above and in line with the axle, and on this shaft are mounted two cams, which, when a lever placed at one end of said shaft is operated, serve to raise the boxes mentioned as being inside the standards and carrying the ends of the beam, and thus raise the cart-body from the frame and transform it into the platform of the scale, hangers or braces being fastened to the cart-body and swung upon links or stirrups depending from the ends of the beam, which project slightly beyond the standards, serving to suspend and keep the load balanced.

For further comprehension of our invention reference must be had to the accompanying drawings, in which similar letters of reference indicate like parts, and where—

Figure 1:
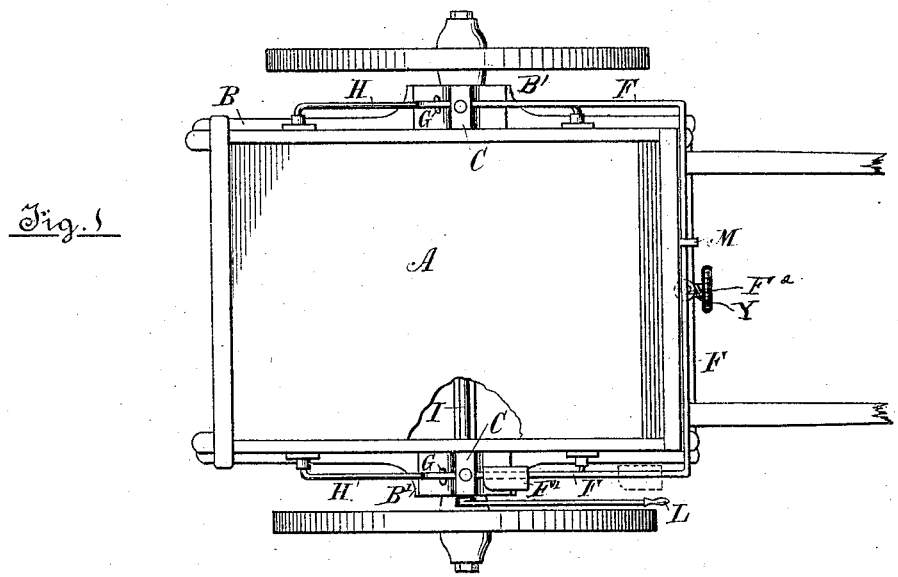
Figure 2:
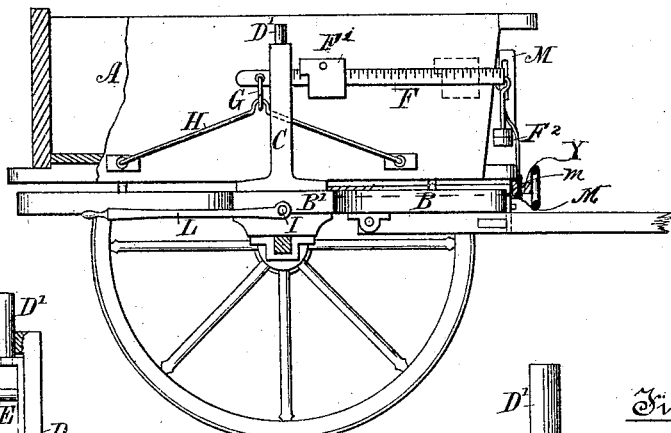
Figure 3:
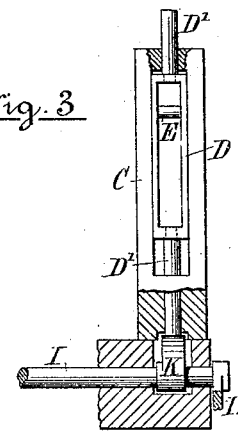
Figure 4:
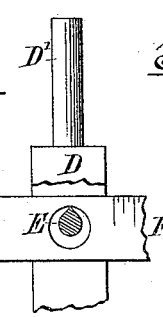
Figure 5:
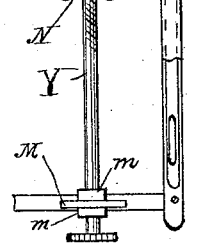

Figure 1 is a plan view of a cart embodying our invention; Fig. 2, a side view of same, partly in section, and with body balanced; Fig. 3, an enlarged detail of standards, showing means for raising boxes in same; and Fig. 4, a detail of one of said boxes enlarged and partly broken away. Fig. 5 is a plan of a portion of the bottom of the cart-body, showing the means for balancing the load with relation to the point of suspension.

A is the cart-body, of any usual or desired construction, resting, when not balanced, upon the frame B, to which the shafts are pivoted or attached. To extensions B' of this frame are bolted or otherwise fastened standards C C, located one on each side of the cart-body, and in this case immediately over the center of the axle. These standards are preferably of the shape shown in detail in Fig. 3, and inside of these run hollow boxes D D, which are carried by spindles D' D', sliding in bearings formed in the upper and lower parts of the standards. These boxes each carry a short shaft or balance pivot, E, of the section shown in Fig. 4—viz., an inverted V—upon the edge of which is balanced the beam F, said balance-pivot passing through a round hole cut near the end of each arm of the beam. The beam F is preferably made of a flat piece or strap of metal, and passes round the front of the cart and along each side to the standards C C, being provided with a sliding weight, F', and stirrup or hanger F², for extra weights, (this latter is placed exactly in the middle of the beam, which in this case is in the front of the cart, as shown,) the beam being, as described, hung at each end upon the balance-pivots E E in the boxes D D, and extending at both ends a short distance beyond the standards, from these projecting ends being hung, by means of links or stirrups G G depending therefrom, the upper angles of hangers or braces H H, the ends of which hangers or braces are fastened at points equidistant from the point of suspension to the body of the cart, thus serving to balance the load properly and at the same time affording the necessary means of suspension from the beam.

Underneath the cart-body and immediately above and in line with the axle we place a shaft, I, its bearings being formed in the extensions B' of the frame B. Near each end of this shaft I are mounted cams K K, one directly under the center of each of the standards C, which cams K K impinge upon the ends of the spindles D' D', carrying the sliding boxes D D, and when the lever L, mounted on one end of the shaft I, is thrown backward or into the position shown in Fig. 2, these cams serve to raise the boxes D D to the position indicated in Fig. 3, and thus by raising the point of suspension of the beam F, which carries with it the links or stirrups G G, lifts, through the hangers H H, the cart-body A from the frame B and suspends the same while the sliding weight is being adjusted and the load weighed.

A slotted guide, M, is placed either as shown near the stirrup F², for the purpose of controlling the rise and fall of the beam, or it may be placed at any other desired point and two or more be used, if requisite.

The usual slide-latch or fastening will be used to secure the frame B to the frame carrying the shafts after the load has been dumped, and, if found necessary, latches may be employed to hold the cart-body firmly to the frame, to prevent jarring when the cart is traveling.

Should it be found necessary to provide means for balancing the load equally on each side of the point of suspension, we provide the following or other equivalent means: A lug, M, is fixed to one of the transverse bars of the cart-body, in which lug is seated one end of a shaft, Y, its other screw-threaded end being received in a tapped plate, N, secured to the central transverse bar of the frame B, the shaft provided with collars $m$ $m$, one on either side of the lug M, so that it can be rotated but cannot move longitudinally with relation to the lug. By turning the screwed shaft in one direction or the other it operates to force the end of the suspended cart-body nearer to or farther from the center of the frame B, and will thus depress or elevate this end of the cart-body. Either the lug M or the tapped plate N on the frame B should be pivoted to admit of some play of the screw-shaft Y. The shaft is provided at its other end with a crank or hand wheel, for operating it.

Although here shown in conjunction with a two-wheeled cart, it must be understood that our invention may be applied with equal facility to vehicles with four wheels, tram-cars, or to sleighs or conveyances upon runners.

It will be observed that by our invention the weighing of a load will be greatly simplified, since the cart-body is designed to represent the platform of the scale as it is balanced with the beam, thus obviating the necessity of allowing for tare, and in all respects making it possible to weigh coal and similar bulk merchandise as accurately upon the cart as upon a platform-scale.

Having thus described our invention, what we claim, and desire to secure by Letters Patent, is as follows:

1. In a combined cart and scale, the standards C C, in combination with sliding boxes D D, and beam F, substantially as described.

2. In a combined cart and scale, the sliding boxes D D, running in standards and having formed in them balance-pivots E E for the beam F, substantially as described.

3. The combination of the shaft I, having mounted thereon cams K K, and operated by lever L, with boxes D D, balance-pivots E E, and beam F, substantially as and for the purposes described.

4. The combination of the hangers or braces H H, links G G, and beam F, as and for the purposes set forth.

5. In a combined cart and scale, a screw-shaft extending under the cart-body at right angles to the axle, for the purpose of balancing the load before weighing.

PATRICK MURPHY.
JAMES JOSEPH LYNETT.

Witnesses:
R. ARTHUR KELLOND,
E. P. QUIRK.